(12) United States Patent
Handl et al.

(10) Patent No.: US 9,919,627 B2
(45) Date of Patent: Mar. 20, 2018

(54) LOCKING UNIT FOR A VEHICLE SEAT, AND VEHICLE SEAT

(71) Applicant: JOHNSON CONTROLS GMBH, Burscheid (DE)

(72) Inventors: Patrick Handl, Köln (DE); Andreas Vedder, Haan (DE); Uwe Moeller, Solingen (DE); Igor Gordeenko, Frechen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 99 days.

(21) Appl. No.: 14/910,539

(22) PCT Filed: Aug. 12, 2014

(86) PCT No.: PCT/EP2014/067222
§ 371 (c)(1),
(2) Date: Feb. 5, 2016

(87) PCT Pub. No.: WO2015/022312
PCT Pub. Date: Feb. 19, 2015

(65) Prior Publication Data
US 2016/0176319 A1 Jun. 23, 2016

(30) Foreign Application Priority Data
Aug. 14, 2013 (DE) ........................ 10 2013 216 054

(51) Int. Cl.
*B60N 2/20* (2006.01)
*B60N 2/22* (2006.01)
(Continued)

(52) U.S. Cl.
CPC ....... *B60N 2/2245* (2013.01); *B60N 2/01583* (2013.01); *B60N 2/366* (2013.01);
(Continued)

(58) Field of Classification Search
CPC .. B60N 2/2245; B60N 2/01583; B60N 2/366; B60N 2/4435; B60N 2/20; E05C 3/24
(Continued)

(56) References Cited

U.S. PATENT DOCUMENTS 8,672,385 B2 * 3/2014 Matsumoto ............ B60N 2/366
296/65.01
2012/0193966 A1 8/2012 Matsuura et al.

FOREIGN PATENT DOCUMENTS

DE 101 26 687 A1 1/2002
DE 103 04 574 B4 2/2005
(Continued)

*Primary Examiner* — Syed A Islam
(74) *Attorney, Agent, or Firm* — McGlew and Tuttle, P.C.

(57) ABSTRACT

A vehicle seat locking unit (10) includes a lock housing having a receptacle opening (19) for receiving a locking bolt (12). A rotary latch (20) is mounted to swivel around a bearing bolt (51) and has a hook aperture (21) for locking together with the locking bolt. The bearing bolt is aligned in an axial direction and the receptacle opening is delimited by a locking bolt stop element (61), located in the hook aperture, which axially protrudes into the lock housing. In a locked state the locking bolt extends in the axial direction. A first contact region (71), between the locking bolt and the stop element, and a second contact region (72), between the locking bolt and the rotary latch, partially overlap in the axial direction, or the first contact region lies completely within the second contact region in the axial direction. A vehicle seat (1) includes such locking unit.

20 Claims, 6 Drawing Sheets

(51) Int. Cl.
*B60N 2/015* (2006.01)
*B60N 2/36* (2006.01)
*B60N 2/44* (2006.01)
*E05C 3/24* (2006.01)

(52) U.S. Cl.
CPC .............. *B60N 2/4435* (2013.01); *B60N 2/20* (2013.01); *B60N 2205/20* (2013.01); *E05C 3/24* (2013.01)

(58) Field of Classification Search
USPC ........................................ 297/378.12, 378.13
See application file for complete search history.

(56) References Cited

FOREIGN PATENT DOCUMENTS

| | | |
|---|---|---|
| DE | 10 2005 023 861 A1 | 2/2006 |
| DE | 10 2008 033 304 A1 | 1/2010 |
| DE | 10 2009 029 674 A1 | 1/2011 |
| EP | 0 198 211 A2 | 10/1986 |
| EP | 1 606 484 B1 | 2/2008 |
| JP | 2010 285127 A | 12/2010 |

\* cited by examiner

LOCKING UNIT FOR A VEHICLE SEAT, AND VEHICLE SEAT

CROSS REFERENCE TO RELATED APPLICATIONS

This application is a United States National Phase Application of International Application PCT/EP2014/067222 filed Aug. 12, 2014 and claims the benefit of priority under 35 U.S.C. § 119 of German Patent Application 10 2013 216 054.2 filed Aug. 14, 2013 the entire contents of which are incorporated herein by reference.

FIELD OF THE INVENTION

The invention relates to a locking unit for a vehicle seat including a lock housing with a receiving opening for receiving a locking bolt, as well as a rotary latch which is mounted so as to be pivotable about a first bearing bolt and comprises a hook aperture for locking with the locking bolt, wherein the bearing bolt is aligned in an axial direction, and the receiving opening is defined by a stop element, the stop element providing a stop for the locking bolt which is situated in the hook aperture, and the stop element projecting into the lock housing in the axial direction. The invention also relates to a vehicle seat including the locking unit.

BACKGROUND OF THE INVENTION

DE 10 2008 033 304 A1 discloses a vehicle seat with a locking unit. The locking unit, in this case, is fastened on a structural part, in particular a backrest, of the vehicle seat and serves for locking the backrest to a structure of the vehicle, or to the bodywork thereof. To this end, the locking unit comprises a rotary latch which is designated as a pawl and, in the locked state of the locking unit, encompasses a locking bolt which is fastened to the structure of the vehicle.

DE 103 04 574 B4 discloses a locking unit for a vehicle seat. A locking unit of this type includes a pivotably mounted rotary latch for locking with a locking bolt. A latching pawl, which is mounted so as to be pivotable about a different pivot axis, secures the rotary latch in the locked state. A tensioning element exerts a closing torque onto the rotary latch and in this way eliminates any play present between the rotary latch and the locking bolt.

DE 101 26 687 A1 discloses a generic locking unit with a stop element, which defines a receiving opening of a lock housing, and a rotary latch with an extensively constant thickness. In a locked state of the locking unit and with a locking bolt which extends precisely in the axial direction, a first contact region between the locking bolt and the stop element is arranged in the axial direction next to a second contact region between the locking bolt and the rotary latch. The rotary latch, in particular a finger and part of a basic body of the rotary latch, is able to pivot past the stop element.

EP 1 606 484 B1 discloses a locking unit for an engine hood of a motor vehicle having a rotary latch and a stop element on a side plate of a lock housing. The stop element juts outward from the lock housing.

These types of locking units serve, for example, for locking a backrest of a vehicle seat to a seat part and/or to a bodywork or structure of a vehicle or for locking the vehicle seat to the bodywork or structure of the vehicle. Engine hoods, trunk lids or doors of vehicles can also be locked to the bodywork or structure of the vehicle with such locking units.

The locking unit comprises a housing which includes two side plates. In the locked state, the locking bolt fits in a receiving opening of the housing and in a hook aperture of the rotary latch. The rotary latch is an extensively flatly formed component which comprises a material thickness of only a few millimeters.

As a result of tolerances in the vehicle or in the vehicle seat, the locking bolt can become skewed relative to the rotary latch such that the locking bolt is no longer aligned parallel to the rotational axis of the rotary latch, but is at a slant thereto. This can result in noise problems when, for example, the rotary latch is somewhat tilted in its bearing position by the inclined locking bolt and, as a result, comes into contact with the housing. In addition, the skewed position of the rotary latch increases the tensioning distance of the locking bolt. The tensioning distance is the smallest measurement between the support surface of the locking bolt at the receiving opening of the housing, on the one hand, and the oppositely situated support surface of the locking bolt at the hook aperture of the rotary latch on the other hand. In the tolerance-free case, where the bolt cross section is circular and support surfaces are arranged distributed about 180° over the bolt circumference between, on the one hand, the locking bolt and the receiving opening of the housing and, on the other hand, the locking bolt and the hook aperture of the rotary latch, the tensioning distance is equal the bolt diameter.

An increase in the tensioning distance results in a play-free position that is provided in the locking unit only having a limited effect as the rotary latch is not able to rotate far enough in the direction of its locking position. Where there is a severe increase in the tensioning distance, the latching pawl is not able to drop in or is not able to drop in completely. The rotary latch is not then secured in the locked state. In addition, the skewed position of the locking bolt results in a loss of overlap between the rotary latch and the latching pawl, which can reduce the strength of the locking unit.

SUMMARY OF THE INVENTION

An object underlying the invention is to improve a locking unit of the type named in the introduction, in particular, when using the locking unit in a vehicle seat, to make said locking unit less sensitive to angular and/or positional tolerances between the rotary latch and the locking bolt.

Said object is achieved according to the invention by a locking unit for a vehicle seat, said locking unit including a lock housing with a receiving opening for receiving a locking bolt, as well as a rotary latch which is mounted so as to be pivotable about a first bearing bolt and comprises a hook aperture for locking with a locking bolt, wherein the bearing bolt is aligned in an axial direction, and the receiving opening is defined by a stop element, the stop element provides a stop for a locking bolt which is situated in the hook aperture, and the stop element projects into the lock housing in the axial direction. In a locked state of the locking unit with the locking bolt extending precisely in the axial direction, a first contact region between the locking bolt and the stop element and a second contact region between the locking bolt and the rotary latch overlap in part in the axial direction, or the first contact region is located completely inside the second contact region in the axial direction.

The first contact region is the sum of the contact surfaces between the locking bolt and the stop element, it also being possible for the contact surfaces to be punctiform or linear and, as a result, being able to comprise a very small surface area. The first contact region can consist of precisely one contact surface or from several contact surfaces. Individual contact surfaces of the first contact surface can be arranged offset with respect to one another without touching one another. The second contact region is the sum of the contact surfaces between the locking bolt and the rotary latch, it also being possible for the contact surfaces to be punctiform or linear and, as a result, being able to comprise a very small surface area. The second contact region can consist of precisely one contact surface or from several contact surfaces. Individual contact surfaces of the second contact surface can be arranged offset with respect to one another without touching one another.

The first contact region overlapping the second contact region in the axial direction means that in a cylindrical coordinate system aligned in the axial direction, part regions of the first contact region and part regions of the second contact region have said same axial coordinates without in this case having to touch one another. The first contact region being located in the axial direction fully inside the second contact region means that in a cylindrical coordinate system aligned in the axial direction, the first contact region has exclusively axial coordinates which also comprise the second contact region.

A generic locking unit for a vehicle seat includes a lock housing with a receiving opening for receiving a locking bolt, as well as a rotary latch which is pivotably mounted and comprises a hook aperture for locking with a locking bolt.

According to the invention, the receiving opening is defined by a stop element which provides a stop for a locking bolt, which is located in the hook aperture, and which projects into the lock housing in the axial direction.

As a result, the distance between the first contact region and the second contact region in the axial direction is reduced. As a result, the tensioning distance in the case of a slanting locking bolt is also reduced and consequently the locking unit is less sensitive to angular and/or positional tolerances between the rotary latch and the locking bolt.

The lock housing preferably includes at least one side plate in which the receiving opening is realized. Another second side plate, which is arranged approximately parallel to the first side plate, is advantageously provided, the receiving opening being realized in both side plates together.

In this case, the stop element projects advantageously into the lock housing in the axial direction from the side plate.

According to an advantageous development of the invention, the stop element is formed by bending a tab which is provided on the side plate. In this way, the production of the stop element and of the locking unit is relatively simple.

In an advantageous manner, the tab, in this case, is bent about a bending angle of approximately between 75° and 85°. In a particularly advantageous manner, the tab is bent about a bending angle of approximately 80°. As a result, the first contact region of the locking bolt with the stop element is severely reduced in the axial direction and is to be seen as approximately punctiform. In this way, the distance between the first contact region and the second contact region always remains minimal in the axial direction. A bending angle of 90° provides a maximum contact surface of the first contact region and consequently reduces the surface pressure.

In a particularly advantageous manner, the first contact region of the locking bolt with the stop element is located, with reference to the locking bolt, diametrically opposite the second contact region of the locking bolt with the rotary latch.

The hook aperture of the rotary latch is preferably defined by a nose (nose portion) and a finger (finger portion). In this case, the nose of the rotary latch serves for holding the locking bolt in the locked state of the locking unit. The finger of the rotary latch serves for ejecting the locking bolt during unlocking. In addition, the locking bolt presses onto the finger during locking and as a result pivots the rotary latch into its closed position.

According to an advantageous further development of the invention, the rotary latch comprises a basic body with an approximately constant thickness, wherein the thickness of the finger is less than the thickness of the basic body. The finger can consequently pivot past the side of the stop element.

The basic body can be formed, in particular punched, from a metal sheet. The reduced thickness of the finger can be generated in one production method step as a result of bending the metal sheet in the region of the finger. The finger, in this case, can be realized integrally with the basic body of the rotary latch. The finger can be arranged eccentrically in the axial direction with respect to the basic body of the rotary latch. The locking unit is constructed in a particularly compact manner by the finger closing off flush with the basic body on one side.

The finger can also be realized as a separate part. In particular, the finger can be an injected plastics material part.

In an advantageous manner, the stop element is arranged offset with respect to the finger in the axial direction such the finger is able to pivot past the side of the stop element. The stop element can overlap the basic body of the rotary latch in the axial direction as a result of the lesser thickness of the finger without there being collisions between the stop element and the rotary latch during a function-related rotation of the rotary latch.

In an advantageous manner, the nose comprises a chamfer on at least one edge which faces the hook aperture. As a result, the second contact region of the locking bolt with the rotary latch is reduced in the axial direction.

Each edge of the nose facing the hook aperture preferably comprises one chamfer each. Both chamfers preferably comprise a similar cross section.

According to a further development of the invention, the two chamfers merge into one another in the axial direction. As a result, the second contact region is severely reduced in the axial direction and is to be seen as approximately punctiform.

According to an advantageous development of the invention, the surface of the nose which faces the locking bolt is realized in a convexly curved manner. As a result, the second contact region is severely reduced in the axial direction and is to be seen as approximately punctiform. In addition, the surface pressure of the nose of the rotary latch onto the locking bolt is reduced.

Said object is also achieved by a vehicle seat which includes at least one locking unit according to the invention.

The invention is explained in more detail below by way of an advantageous exemplary embodiment shown in the figures. However, the invention is not restricted to said exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the embodiment of the invention is illustrated.

DESCRIPTION OF THE PREFERRED EMBODIMENTS

Figure 1:
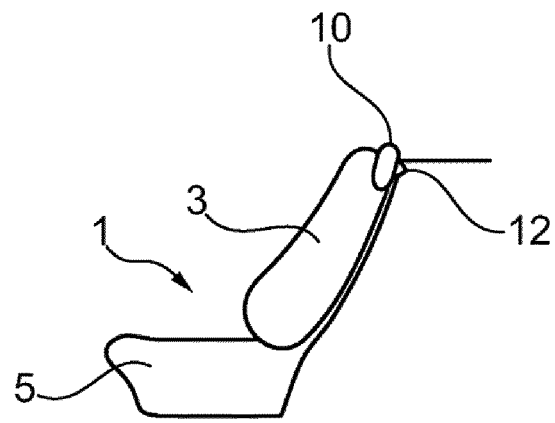
FIG. 1 is a schematic representation of a vehicle seat.
Figure 2:
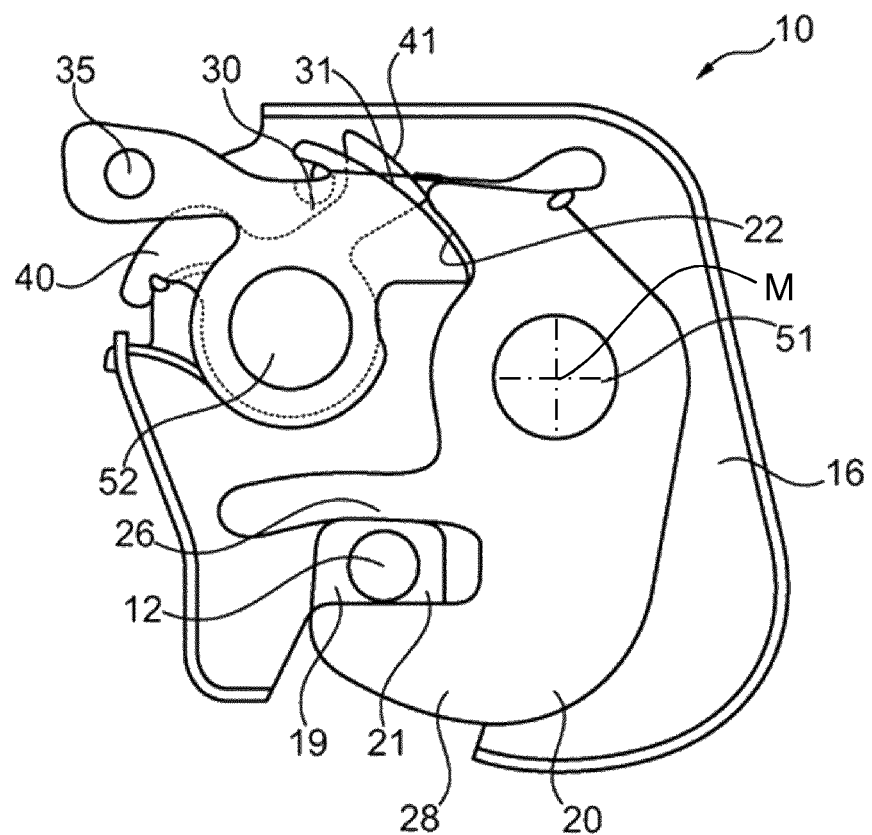
FIG. 2 is a section through a locking unit according to the prior art.

A locking unit 10 is provided in a motor vehicle for connecting a structural part, in the present case a backrest 3, of a vehicle seat 1, in particular a rear seat, to a vehicle structure. The backrest 3, in this case, is attached to a seat part 5 so as to be pivotable from a position of use into a position of non-use.

The locking unit 10 is also usable in other places, for example for fastening the seat part 5 of the vehicle seat 1 to the floor structure of the motor vehicle or in a door lock.

The arrangement of the vehicle seat 1 inside the vehicle and the usual direction of travel of the same are defined by the direction information used below. In this case, a direction oriented perpendicular to the ground is designated below as the vertical direction and a direction perpendicular to the vertical direction and perpendicular to the direction of travel is designated below as the transverse direction.

The locking unit 10 comprises a lock housing which includes a first side plate 16 and a second side plate (not shown). The surface areas of the first side plate 16 and of the second side plate are developed in an extensively flat manner in the present case and are arranged in a plane defined by the direction of travel and the vertical direction, that is to say perpendicular to the transverse direction. The first side plate 16 and the second side plate each include two bearing bores which are realized in a circular manner in the present case.

An in particular slot-shaped receiving opening 19, which opens in particular in a funnel-shaped manner in the direction of a locking bolt 12 in order to receive the same for locking, is realized in the first side plate 16 and in the second side plate. In the present case, the locking unit 10 in this case is fastened on the backrest 3 and the locking bolt 12 on the vehicle structure. It is also conceivable for the locking unit 10 to be fastened on the vehicle structure 12 and the locking bolt 12 on the backrest 3.

A rotary latch 20 is pivotably mounted on a first bearing bolt 51 which is fastened, in turn, on the first side plate 16 and on the second side plate. The first bearing bolt 51 is inserted into one bearing bore each of the first side plate 16 and of the second side plate. The first bearing bolt 51 consequently extends horizontally in the transverse direction in the present case. The preferably metal first bearing bolt 51 is riveted or caulked with the first side plate 16 and the second side plate in the present case. The bearing bolt 51 is extensively rotationally symmetrical about the center axis M. The bearing bolt is aligned in the direction of the center axis M. A direction which is defined by the center axis M of the first bearing bolt 51 is designated below as the axial direction. Consequently, the bearing bolt 51 is aligned in the axial direction. In this case, the term axial direction includes all vectors which extend parallel to the center axis M, irrespective of whether or not they are in alignment with the center axis M.

The portion of the locking bolt 12 to be received by the receiving opening 19 extends in the axial direction in the case of optimum mounting. In practice, in the majority of cases the locking bolt 12 extends in a slightly slanting manner with respect to the axial direction on account of tolerances.

The rotary latch 20 comprises a rotary latch hole 24 which, in the present case, is realized as a circular opening and which is penetrated by the first bearing bolt 51. The rotary latch 20 is prestressed in the opening direction by means of a spring. The bearing bolt 51 mounts the rotary latch 20 so that it is pivotable.

The rotary latch 20 additionally comprises a hook aperture 21 for interaction with the locking bolt 12. On the side located away from the rotary latch hole 24, the hook aperture 21 is defined at the side by a nose 28 of the rotary latch 20. On the side facing the rotary latch hole 24, the hook aperture 21 is defined at the side by a finger 26 of the rotary latch 20. In the present case, the finger 26 is realized integrally with the basic body of the rotary latch 20. However, the finger 26 can also be realized as a separate part, in particular as a plastics part injected onto the rotary latch 20.

The rotary latch 20 comprises a function surface 22 for interaction with a latching pawl 30 and a tensioning element 40. In the locked state, the function surface 22 points approximately in the direction of a second bearing bolt 52, which is arranged parallel to the first bearing bolt 51 and pivotably mounts the latching pawl 30 and the tensioning element 40. The function surface 22, in the present case, is realized in a planar manner, but can also be curved arcuately, for example, and realized in a convex or concave manner.

The second bearing bolt 52 is also inserted into one bearing bore each of the first side plate 16 and of the second side plate. The second bearing bolt 52 consequently also extends in the axial direction which, in the present case, corresponds to the transverse direction. The preferably metal second bearing bolt 52 is riveted or caulked with the first side plate 16 and the second side plate in the present case.

The rotary latch 20 is realized in the same manner in the case of the first and the second exemplary embodiment and comprises a basic body which is defined for the most part in each case in the axial direction by a flat surface area. The width of the function surface 22 corresponds to the thickness of the basic body of the rotary latch 20, that is to say the extension of the basic body in the axial direction.

The thickness of the nose 28 also corresponds extensively to the thickness of the basic body of the rotary latch 20. The nose 28, however, comprises a chamfer 29 on each of the two sides on the edges facing the hook aperture 21.

The thickness of the finger 26, however, is less than the thickness of the basic body of the rotary latch 20. In the present case, the thickness of the finger 26 is approximately a third of the thickness of the basic body of the rotary latch 20.

The tensioning element 40 is mounted so as to be pivotable on the second bearing bolt 52. To this end, the tensioning element 40 comprises a tensioning element hole which, in the present case, is circular and is penetrated by the second bearing bolt 52. The tensioning element 40 is prestressed toward the rotary latch 20 by means of a spring.

In the locked state, when the hook aperture 21 of the rotary latch 20 receives the locking bolt 12 and extends transversely with respect to the receiving opening, the tensioning element 40, as the securing element, exerts a closing torque onto the rotary latch 20. To this end, the tensioning element 40 comprises a tensioning surface 41 which is curved eccentrically with respect to the second bearing bolt 52 and is situated in non-self-locking contact with the function surface 22 of the rotary latch 20. The tensioning surface 41 is arcuately curved in the present case and is realized in a convex manner.

The latching pawl 30 is arranged adjacent the tensioning element 40 on the second bearing bolt 52 and is also mounted so as to be pivotable on the second bearing bolt 52, that is to say in alignment with the tensioning element 40. To this end, the latching pawl 52 comprises a latching pawl hole which is circular in the present case and is penetrated by the second bearing bolt 52. The latching pawl 30 is prestressed toward the rotary latch 20 by means of a spring.

The tensioning element 40 is arranged adjacent the first side plate 16 in the present case and the latching pawl 30 is arranged adjacent the second side plate in the present case. The latching pawl 30 and the tensioning element 40 are coupled with play for entrainment, for example by means of a slot/pivot guide or by means of an axially protruding entrainment means.

The latching pawl 30 comprises a latching surface 31 which is situated in the vicinity of the tensioning surface 41 of the tensioning element 40. In the locked state, the latching surface 31 is positioned at a spacing to the function surface 22 of the rotary latch 20. In the present case, the latching surface 31 is curved arcuately and is realized in a convex manner, but can also be planar.

The width of the function surface 22, which corresponds to the thickness of the basic body of the rotary latch 20, also corresponds approximately to the sum of the thickness of the latching pawl 30 and of the thickness of the tensioning element 30. The rotary latch 20 therefore comprises approximately the same material thickness as the material thicknesses of the latching pawl 30 and of the tensioning element 40 together.

If, in the event of a crash, the rotary latch 20 experiences an opening torque and the tensioning element 40 is pressed away somewhat, the latching surface 31 moves into abutment against the function surface 22 of the rotary latch 20. Thus, the latching pawl 39 serves for supporting the rotary latch 20 and, as a further securing element, prevents the rotary latch 20 rotating further in the opening direction. Consequently, the latching pawl 30 prevents the rotary latch 20 from opening.

In the locked state of the locking unit 12, the locking bolt 12 is situated in the receiving opening 19, which is realized in the first side plate 6 and in the second side plate, and in the hook aperture 21 of the closed rotary latch 20. The receiving opening 19 and the hook aperture 21 extend crosswise with respect to one another in the locked state. The tensioning element 40 secures the rotary latch 20 as a result of interaction between the tensioning surface 41 and the function surface 22. The latching surface 31 of the latching pawl 30 is at a slight spacing from the function surface 22 of the rotary latch 20.

For opening the locking unit 10, the latching pawl 30 is pivoted away from the rotary latch 20 by means of an unlocking lever 35, as a result of which the latching surface 31 of the latching pawl 30 is removed further from the function surface 22 of the rotary latch 20. The latching pawl 30 entrains the tensioning element 40 on account of the entrainment coupling such that the rotary latch 20 is no longer secured. The latching pawl 30, in this case, also entrains the rotary latch 20, as a result of which said rotary latch opens, that is to say pivots in the opening direction.

On account of the pivoting movement of the rotary latch 20, the hook aperture 21 is pulled back from the receiving opening 19 realized in the first side plate 16 and in the second side plate and releases the locking bolt 12 which is removed in opposition to the pivoting-in direction of the locking unit 10. If the locking bolt 12 has left the hook aperture 21, the locking unit 10 is situated in the unlocked state.

If in said unlocked state the locking bolt 12 moves back into the receiving opening 19 which is formed in the first side plate 16 and in the second side plate and into abutment against the finger 26, the locking bolt 12 presses the rotary latch 20 into its closed position. The tensioning element 40 is moved along the function surface 22. Entrained by the tensioning element 40 or on account of the prestressing of a spring, the latching pawl 30 pivots toward the rotary latch 20, the latching surface 31 approaching the function surface 22 of the rotary latch 20 and being located opposite the same at a small spacing. The locking unit 10 is then in the locked state again.

Figure 3:
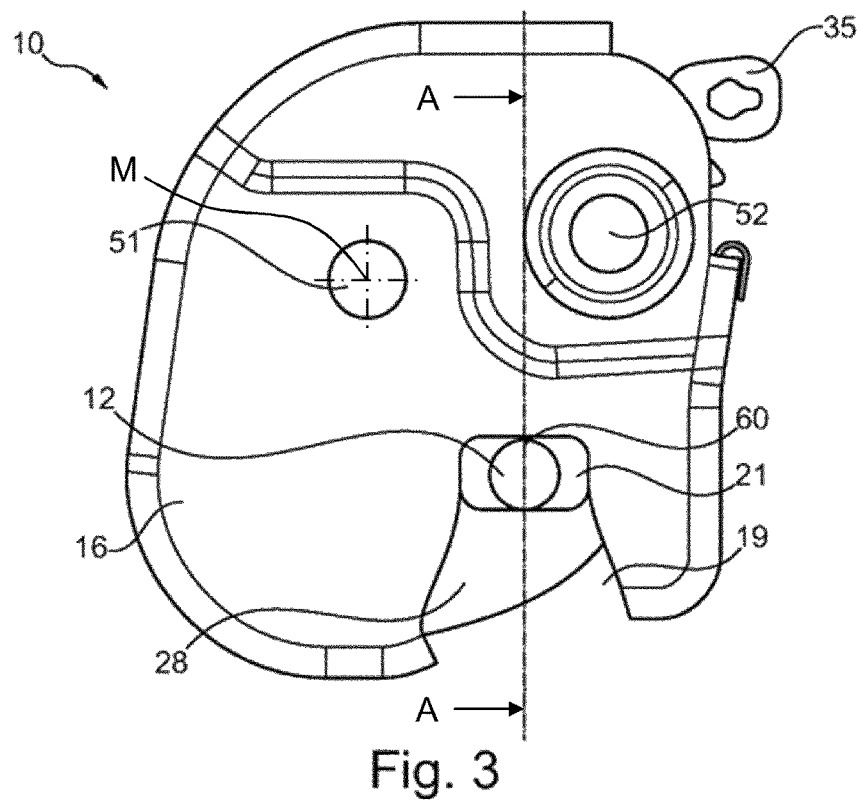
FIG. 3 is a side view of a locking unit according to the prior art.
Figure 4:
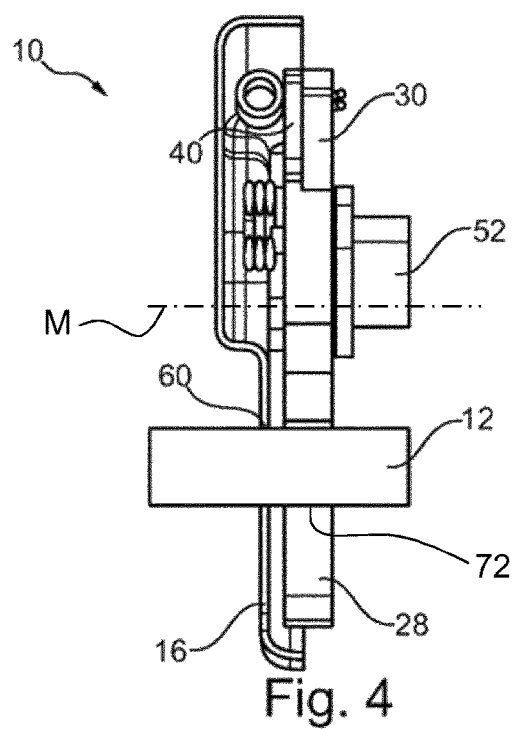
FIG. 4 is a sectional view along the line A-A from FIG. 3.

In the case of a locking unit 10 disclosed in the prior art and shown in FIGS. 3 and 4, the receiving opening 19 is defined by a stop region 60 which is provided in each case on the first side plate 16 and on the second side plate.

In the locked state, the locking bolt 12, insofar as it extends precisely parallel to the bearing bolts 51, 52 in the axial direction, abuts against the stop regions 60 on the first side plate 16 and the second side plate. The stop regions 60 on the first side plate 16 and the stop region on the second side plate together form a first contact region 71. The first contact region 71 is the sum of the contact surfaces between the locking bolt 12 and the stop regions 60. On the side located opposite the stop regions 60, the locking bolt 12 is in contact with the nose 28 of the rotary latch 20 in a second contact region 72. The second contact region 72 is the sum of the contact surfaces between the locking bolt and the rotary latch. The stop region 60 on the first side plate 16, the second contact region 72 of the locking bolt 12 with the nose 28 of the rotary latch 20 and the stop region on the second side plate are therefore located offset to one another in the axial direction. Consequently, the first contact region 71 and the second contact region 72 are arranged in such a manner that they do not overlap in the axial direction. The first contact region 71 consists of two contact surfaces which are spaced apart from one another and receive the second contact region 72 between them.

If the locking bolt 12 does not extend precisely parallel to the bearing bolts 51, 52 in the axial direction, but rather at a slant with respect to the axial direction, the locking bolt 12 abuts either against the stop region 60 of the first side plate 16 or against the stop region of the second side plate. In addition, the locking bolt 12 abuts against an edge of the nose 28 of the rotary latch 20.

Figure 9:
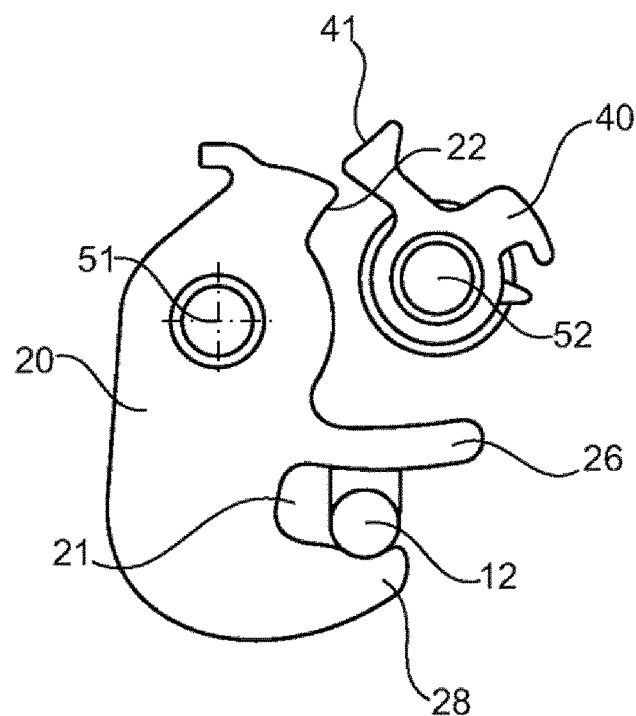
FIG. 9 is a side view of a rotary latch according to the prior art with the locking bolt at a slant.

From a certain slant of the locking bolt 12 with respect to the axial direction, the locking bolt 12, when the locking unit 10 is closed, prevents the rotary latch 20 from dropping in fully. In addition, the tensioning element 40 is blocked by the rotary latch 20 and the tensioning surface 41 cannot move into contact with the function surface 22. Consequently, the tensioning element 40 cannot exert any closing torque onto the rotary latch 20 for tolerance compensation. Such a position of the rotary latch 20 and of the tensioning element 40 is shown in FIG. 9.

Figure 5:
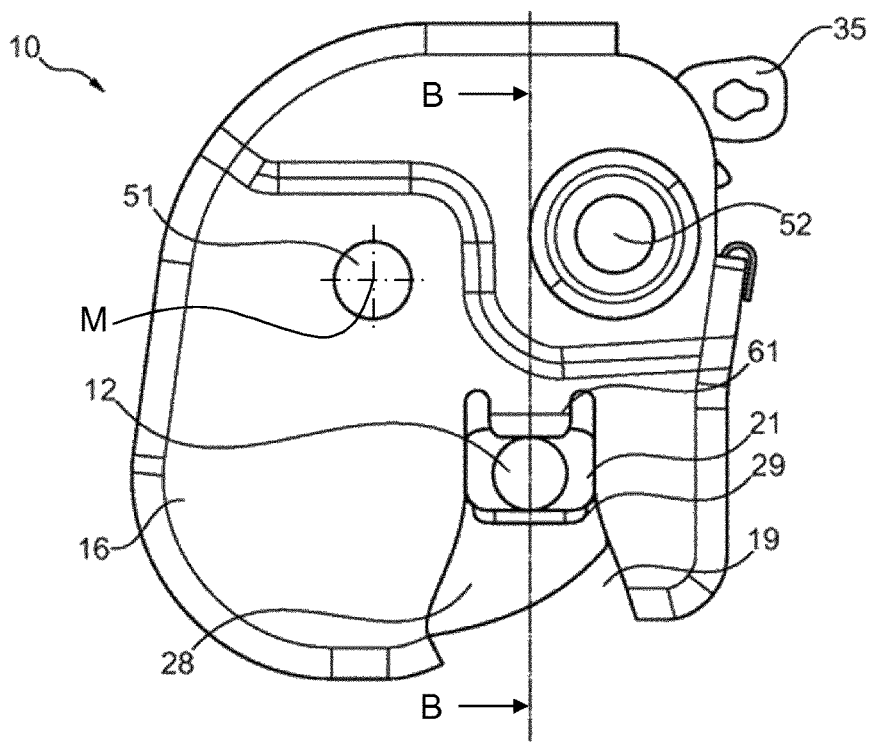
FIG. 5 is a side view of a locking unit according to a first exemplary embodiment.
Figure 6:
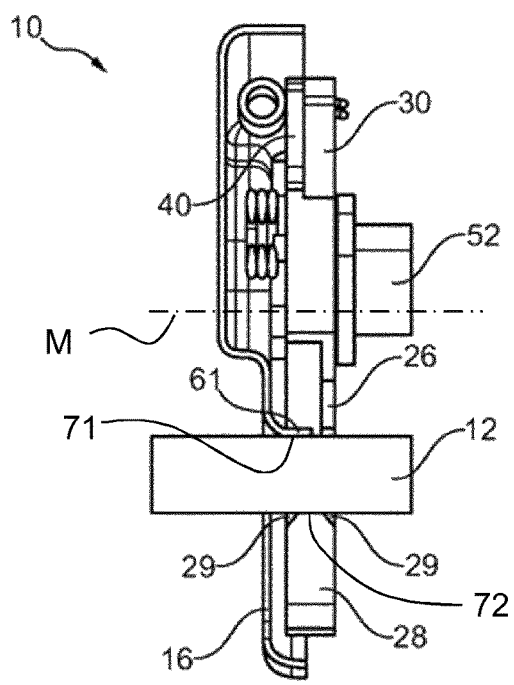
FIG. 6 is a section along the line B-B from FIG. 5.

According to a first exemplary embodiment shown in FIGS. 5 and 6, the first side plate 16 comprises a stop element 61 which defines the receiving opening 19. The stop element 61, in the present case, is formed by bending a tab which is provided on the first side plate 16. The tab, in this case, is bent by approximately 90°, the stop element 61 consequently extends into the lock housing of the locking unit 10 in the axial direction at right angles to the rest of the first side plate 16.

The stop element 61 is therefore realized integrally with the first side plate 16 in the present case. The stop element 61 extends in the axial direction up to just in front of the finger 26 of the rotary lock 20 without touching said finger.

In the locked state, the locking bolt 12, insofar as it extends precisely parallel to the bearing bolts 51, 52 in the axial direction, abuts flatly against the stop element 61. On the side located opposite the stop element 61, the locking bolt 12 is in contact with the nose 28 of the rotary latch 20, with the region which is located between the chamfers 29.

The first contact region 71 of the locking bolt 12 with the stop element 61 consequently extends approximately over the entire length of the stop element 61 in the axial direction. The second contact region 72 of the locking bolt 12 with the rotary latch 20 extends in the axial direction approximately over the region of the nose 28 which is located between the chamfers 29. The first contact region 71 of the locking bolt 12 with the stop element 61 and the oppositely situated second contact region 72 of the locking bolt 12 with the rotary latch 20 overlap in part in the axial direction.

If the locking bolt 12 does not extend precisely parallel to the bearing bolts 51, 52 in the axial direction, but in a slanting manner with respect to the axial direction, the second contact region 72 of the locking bolt 12 with the rotary latch 20 is displaced in the axial direction to an edge of one of the two chamfers 29 on the nose 28. The first contact region 71 of the locking bolt 12 with the stop element 61 is also displaced. Depending on the orientation of the slant of the locking bolt 12, the first contact region 71 of the locking bolt 12 with the stop element 61 is located at the end of the stop element 61, that is to say centrally in the lock housing of the locking unit 10, or in the vicinity of the transition between the side plate 16 and the stop element 61.

In the first case, when the first contact region 71 of the locking bolt 12 with the stop element 61 is located centrally in the lock housing of the locking unit 10, the second contact region 72 of the locking bolt 12 with the rotary latch 20 is located only slightly away from the first contact region 71 of the locking bolt 12 with the stop element 61 in the axial direction. In said case, the slant of the locking bolt 12 only has a relatively small effect on the position of the rotary latch 20 during locking.

In the second case, when the first contact region 71 of the locking bolt 12 with the stop element 61 is located in the vicinity of the transition between the side plate 16 and the stop element 61, the second contact region 72 of the locking bolt 12 with the rotary latch 20 is located further away from the first contact region 71 of the locking bolt 12 with the stop element 61 than in the above-described first case, but not so far as in the case of a locking unit 10 according to the prior art.

Figure 10:
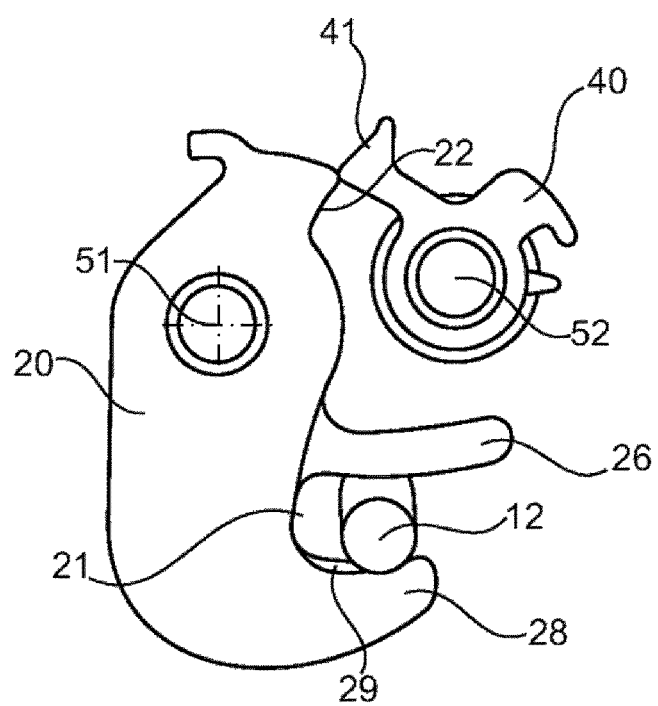
FIG. 10 is a side view of a rotary latch according to the first exemplary embodiment with the locking bolt at a slant.

Up to a certain slant of the locking bolt 12 with respect to the axial direction, the tensioning surface 41 of the tensioning element 40 still comes into the contact with the function surface 22 of the rotary latch 20 and the tensioning element 40 exerts a closing torque onto the rotary latch 20 for tolerance compensation. Such a position of the rotary latch 20 and of the tensioning element 40, where the tensioning surface 41 is just in contact with the function surface 22, is shown in FIG. 10.

Figure 7:
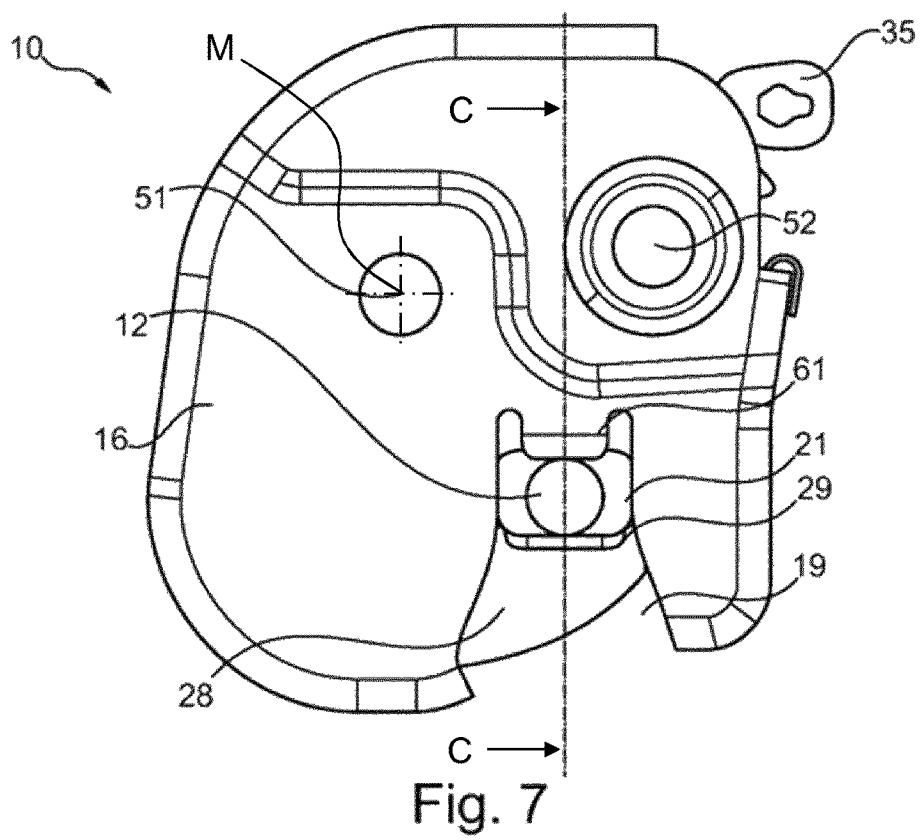
FIG. 7 is a side view of a locking unit according to a second exemplary embodiment.
Figure 8:
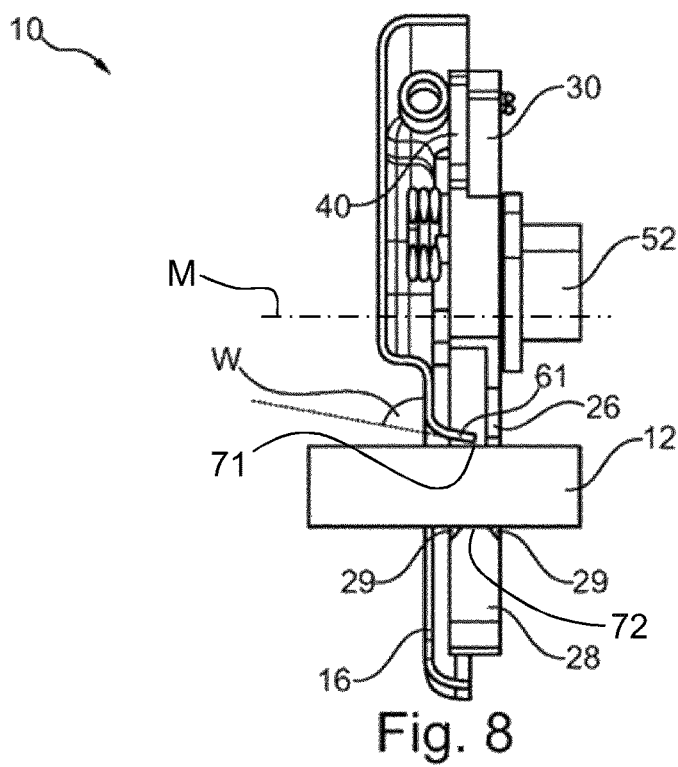
FIG. 8 is a section along the line C-C from FIG. 7.

According to a second exemplary embodiment shown in FIGS. 7 and 8, the first side plate 16 also comprises a stop element 61 which defines the receiving opening 19. The stop element 61, in the present case, is formed by bending a tab which is provided on the first side plate 16. In this case, in contrast to the first exemplary embodiment, the tab is bent by a bending angle W of approximately 80°. The stop element 61 consequently extends into the lock housing of the locking unit 10 in a slanting manner with respect to the rest of the first side plate 16 and in a slanting manner with respect to the axial direction.

The stop element 61, in the present case, is realized integrally with the first side plate 16. The stop element 61 extends in the axial direction up to just in front of the finger 26 of the rotary latch 20 without touching said finger.

In the locked state, the locking bolt 12, insofar as it extends precisely parallel to the bearing bolts 51, 52 in the axial direction, abuts against the end of the stop element 61, that is to say centrally in the lock housing of the locking unit 10. The first contact region 71 between the stop element 61 and the locking bolt 12 is approximately punctiform. On the side located opposite the stop element 61, the locking bolt 12 is in contact with the nose 28 of the rotary latch 20, with the region which is located between the chamfers 29.

The second contact region 72 of the locking bolt 12 with the rotary latch 20 extends in the axial direction approximately over the region of the nose 28 which is located between the chamfers 29. The first contact region 71 of the locking bolt 12 with the stop element 61 is consequently located in the axial direction inside the second contact region 72 of the locking bolt 12 with the rotary latch 20, preferably centrally. The first contact region 71 of the locking bolt 12 with the stop element 61 is located, with reference to the locking bolt 12, diametrically opposite the second contact region 72 of the locking bolt 12 with the rotary latch 20.

It is also conceivable for the two chamfers 29 to merge into one another in the axial direction. As a result, the second contact region 72 is approximately punctiform in the axial direction. The nose 28 of the rotary latch 20 therefore comprises an edge on its side that faces the locking bolt 12. It is also conceivable for the surface of the nose 28 that faces the locking bolt 12 to be realized in a convexly curved manner. The second contact region 72 is also approximately punctiform as a result. The punctiform first contact region 71 is then located, with reference to the locking bolt 12, diametrically opposite the punctiform second contact region 72.

If the locking bolt 12 does not extend precisely parallel to the bearing bolts 51, 52 in the axial direction, but rather at a slant with respect to the axial direction, the second contact region 72 of the locking bolt 12 with the rotary latch 20 is displaced in the axial direction to an edge of one of the two chamfers 29 on the nose 28. However, the first contact region 71 of the locking bolt 12 with the stop element 61 is not displaced, but remains at the end of the stop element 61, that is to say centrally in the lock housing of the locking unit 10.

The second contact region 72 of the locking bolt 12 with the rotary latch 20 is consequently located only slightly away from the first contact region 71 of the locking bolt 12 with the stop element 61 in the axial direction. Consequently, the slanting of the locking bolt 12 only has a relatively small effect on the position of the rotary latch 20 during locking.

Figure 11:
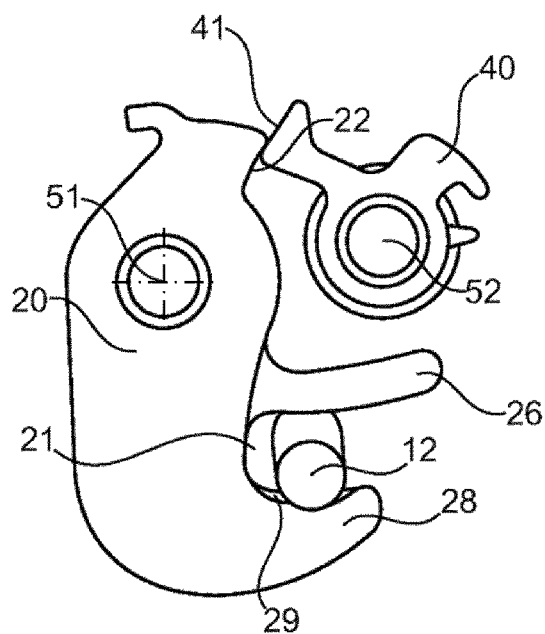
FIG. 11 is a side view of a rotary latch according to the second exemplary embodiment with the locking bolt at a slant.
Figure 12:
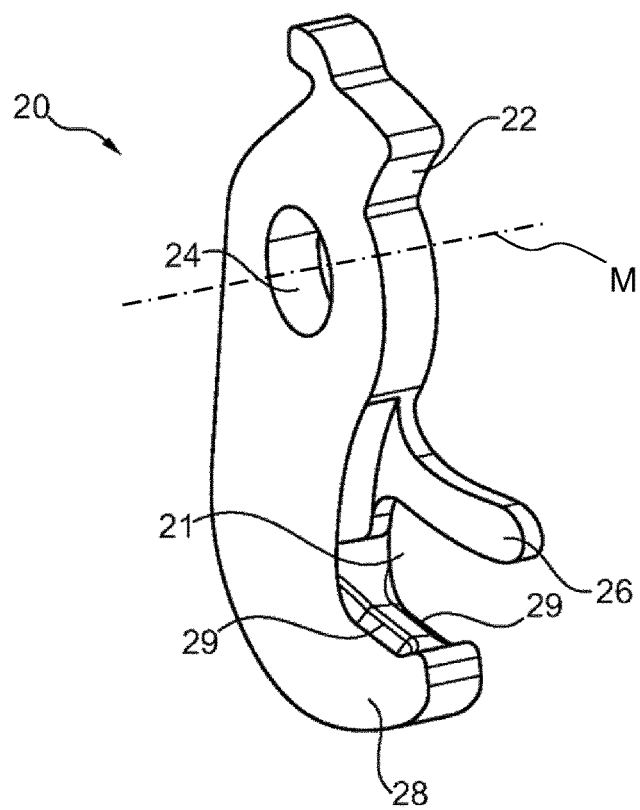
FIG. 12 is a perspective representation of a rotary latch according to the first and the second exemplary embodiment.

During locking, the tensioning surface 41 of the tensioning element 40 moves into contact with the function surface 22 of the rotary latch 20 and the tensioning element 40 exerts a closing torque onto the rotary latch 20 for tolerance compensation. Such a position of the rotary latch 20 and of the tensioning element 40 is shown in FIG. 11.

In the case of the first exemplary embodiment shown in FIG. 5 and FIG. 6, as well as in the case of the second exemplary embodiment shown in FIG. 7 and FIG. 8, the stop element 61 is arranged in each case offset in the axial direction with respect to the finger 26 of the rotary latch 20. As a result, during the locking and during the unlocking of the locking unit 10, the finger 26 pivots past the stop element 61, preferably without touching said stop element.

The features disclosed in the preceding description, the claims and the drawings can be significant to the realization of the invention in their different developments both on their own and in combination.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, said locking unit comprising:
    a lock housing with a receiving opening for receiving a locking bolt;
    a bearing bolt; and
    a rotary latch which is mounted so as to be pivotable about the bearing bolt and which comprises a hook aperture for locking with the locking bolt, wherein the bearing bolt is aligned in an axial direction, and the receiving opening is defined by a stop element, the stop element provides a stop for the locking bolt which is situated in the hook aperture, and the stop element projects into the lock housing in the axial direction, in a locked state of the locking unit with the locking bolt extending precisely in the axial direction, a first contact region, between the locking bolt and the stop element, and a second contact region, between the locking bolt and the rotary latch, overlap in part in the axial direction, or the first contact region is located completely inside the second contact region in the axial direction.

2. The locking unit as claimed in claim 1, wherein the first contact region is precisely a continuous, linear contact surface.

3. The locking unit as claimed in claim 1, wherein the first contact region is precisely a continuous, punctiform contact surface.

4. The locking unit as claimed in claim 1, wherein the lock housing includes at least one side plate in which the receiving opening is realized.

5. The locking unit as claimed in claim 4, wherein the stop element projects into the lock housing in the axial direction from the side plate.

6. The locking unit as claimed in claim 4, wherein the stop element is formed by bending a tab which is provided on the side plate.

7. The locking unit as claimed in claim 6, wherein the tab is bent about a bending angle of between 75° and 85°.

8. The locking unit as claimed in claim 6, wherein the tab is bent about a bending angle of approximately 90°.

9. The locking unit as claimed in claim 1, wherein the hook aperture is defined by a nose portion and a finger portion.

10. The locking unit as claimed in claim 9, wherein the rotary latch comprises a basic body with an approximately constant thickness, wherein the thickness of the finger portion is less than the thickness of the basic body.

11. The locking unit as claimed in claim 10, wherein the finger portion is arranged eccentrically in the axial direction with respect to the basic body of the rotary latch.

12. The locking unit as claimed in claim 9, wherein the stop element is arranged offset to the finger portion in the axial direction in such a manner that the finger portion is able to pivot past the stop element.

13. The locking unit as claimed in claim 10, wherein the stop element overlaps the basic body of the rotary latch in the axial direction.

14. The locking unit as claimed in claim 9, wherein the nose portion comprises a chamfer on at least one edge which faces the hook aperture.

15. A vehicle seat comprising: at least one locking unit comprising:
    a lock housing with a receiving opening for receiving a locking bolt;
    a bearing bolt; and
    a rotary latch which is mounted so as to be pivotable about the bearing bolt and which comprises a hook aperture for locking with the locking bolt, wherein the bearing bolt is aligned in an axial direction, and the receiving opening is defined by a stop element, the stop element provides a stop for the locking bolt which is situated in the hook aperture, and the stop element projects into the lock housing in the axial direction, in a locked state of the locking unit with the locking bolt extending precisely in the axial direction, a first contact region, between the locking bolt and the stop element, and a second contact region, between the locking bolt and the rotary latch, overlap in part in the axial direction, or the first contact region is located completely inside the second contact region in the axial direction.

16. The vehicle seat as claimed in claim 15, wherein the first contact region is precisely a continuous, linear contact surface.

17. The vehicle seat as claimed in claim 15, wherein the first contact region is precisely a continuous, punctiform contact surface.

18. The vehicle seat as claimed in claim 15, wherein the lock housing includes at least one side plate in which the receiving opening is realized.

19. The vehicle seat as claimed in claim 18, wherein the stop element projects into the lock housing in the axial direction from the side plate.

20. The vehicle seat as claimed in claim 18, wherein the stop element is formed by bending a tab which is provided on the side plate.

* * * * *